United States Patent [19]

Tanka et al.

[11] Patent Number: 4,860,376

[45] Date of Patent: Aug. 22, 1989

[54] CHARACTER RECOGNITION SYSTEM FOR OPTICAL CHARACTER READER

[75] Inventors: Hideaki Tanka, Osaka; Morihiro Katsurada, Nara; Minehiro Konya, Osaka, all of Japan

[73] Assignee: Sharp Kabushiki Skaisha, Osaka, Japan

[21] Appl. No.: 164,347

[22] Filed: Mar. 4, 1988

[30] Foreign Application Priority Data

Mar. 4, 1987 [JP] Japan ................... 62-49172

[51] Int. Cl.⁴ ............................................. G06K 9/03
[52] U.S. Cl. ......................................... 382/57; 382/9; 382/40
[58] Field of Search ........................ 382/9, 48, 40, 57

[56] References Cited

U.S. PATENT DOCUMENTS

| | | | |
|---|---|---|---|
| 2,905,927 | 9/1959 | Reed | 382/40 |
| 3,295,105 | 12/1966 | Gray et al. | 382/48 |
| 3,651,459 | 3/1972 | Hahn | 382/40 |
| 4,024,500 | 5/1977 | Herbst et al. | 382/9 |
| 4,075,605 | 2/1978 | Hilley et al. | 382/48 |
| 4,491,965 | 1/1985 | Yoshimura | 382/57 |
| 4,558,461 | 12/1985 | Sclang | 382/48 |
| 4,674,065 | 6/1987 | Lange et al. | 382/57 |
| 4,727,588 | 2/1988 | Fox et al. | 382/9 |

*Primary Examiner*—Leo H. Boudreau
*Assistant Examiner*—Donald J. Daley
*Attorney, Agent, or Firm*—Flehr, Hohbach, Test, Albritton & Herbert

[57] ABSTRACT

After an optical character reader initially identifies individual characters in a character array by matching their images with dictionary patterns, its character recognition system assigns upper and lower labels to the characters according to their highest and lowest positions relative to the character array. If these assigned values contradict with the labels preassigned to the identified characters, corrections are made accordingly and certain frequently occurring types of errors are checked in terms of these labels. Upper and lower case letters which are shaped similarly and certain similarly looking symbols can thus be correctly identified.

2 Claims, 6 Drawing Sheets

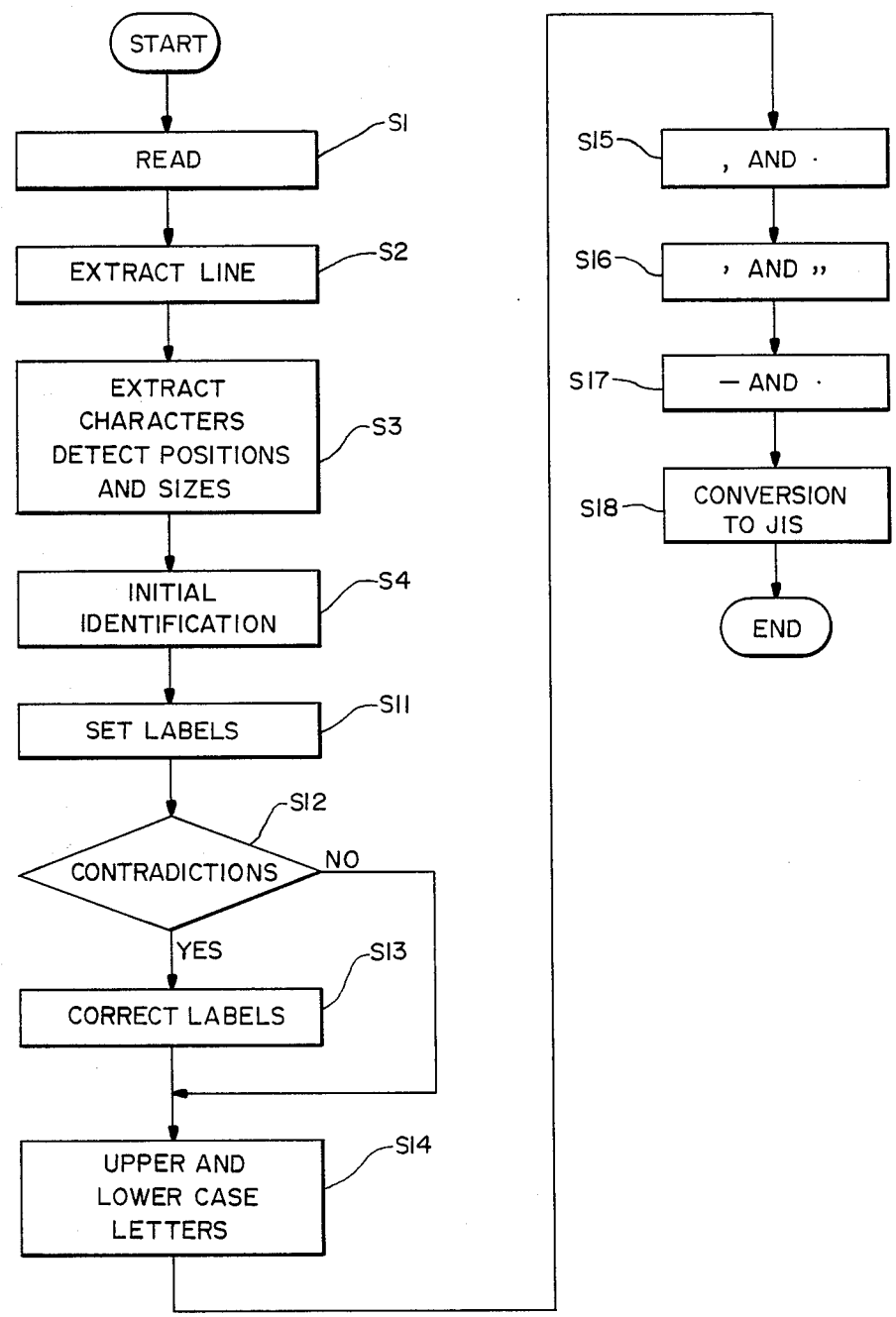
FIG.—1

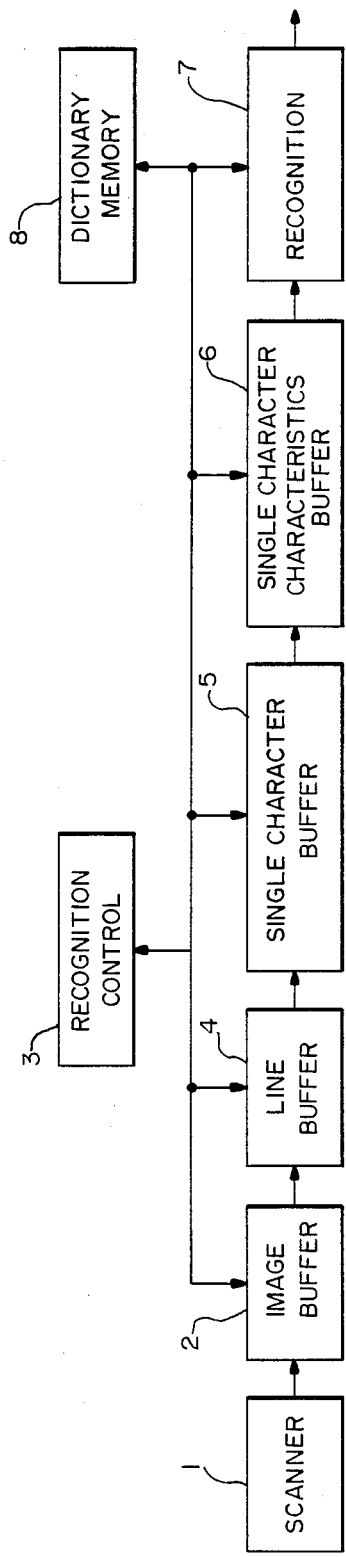

```
| | | | | 2 | 0     UPPER LABEL BUFFER c o m p u t e r ,

| | | 2 | | | |     LOWER LABEL BUFFER
```

FIG.—5

```
2 2 2 | 2 2         UPPER LABEL BUFFER d i d n , t

| | | | 0 |         LOWER LABEL BUFFER
```

FIG.—9A

```
  | 2
        — LOWEST POSITION
n —+—
        — CENTER LINE OF CHARACTER WICH LABELS (l,l)
  | 0
```

| | | | 0 |
```

FIG.—10A

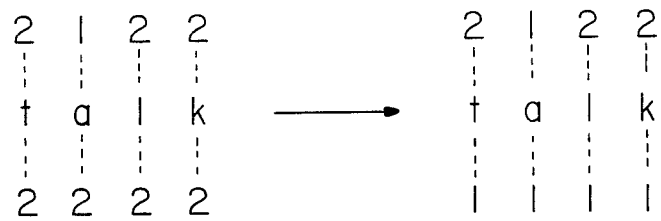
FIG.—6
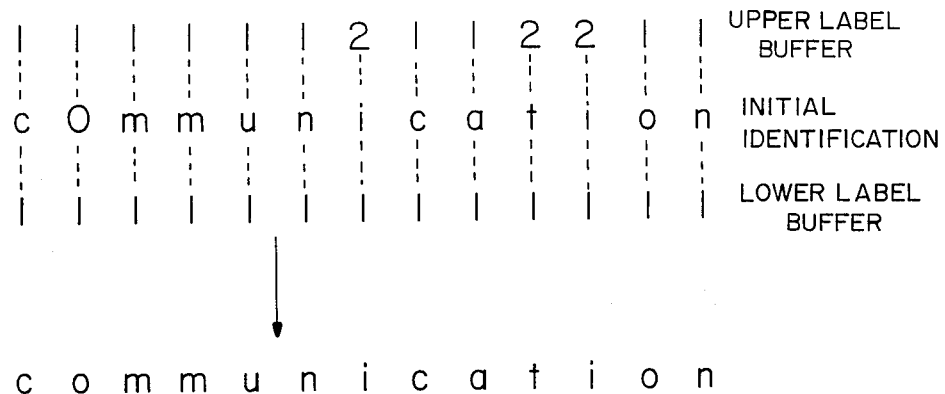
FIG.—7
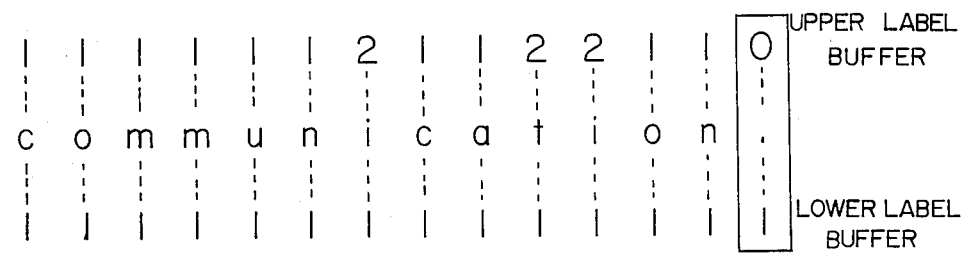
FIG.—8A
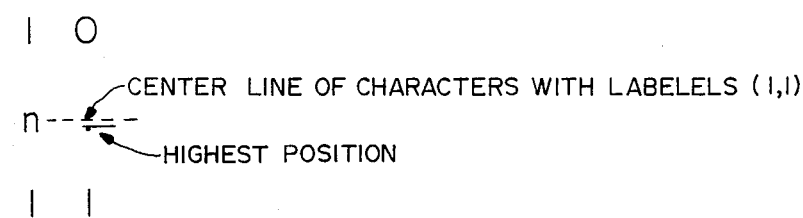
FIG.—8B

FIG.–10B

FIG.–11 not only play poker but also

DETECTION LINES HISTOGRAM (PRIOR ART)
FIG.–12 end (PRIOR ART)
FIG.–13

(PRIOR ART)
FIG.—14A
(PRIOR ART)
FIG.—14B
(PRIOR ART)
FIG.—14C

CHARACTER RECOGNITION SYSTEM FOR OPTICAL CHARACTER READER

BACKGROUND OF THE INVENTION

This invention relates to a character recognition system for an optical alphanumeric character reader and more particularly to such a system for correctly identifying letters in upper and lower cases and certain symbols.

Roman alphabet includes letters of which the upper and lower cases are shaped similarly to each other such as "C" with "c" and "S" with "s". Some symbols look alike such as "," and "'" while some symbols are easily misidentified as two different symbols such as """ and an arrow. Such characters and symbols cannot be identified easily by an optical character reader merely by matching their images with patterns in a dictionary memory. Prior art systems recognize characters and symbols by determining detection lines from a histogram taken in the horizontal direction from an extracted line as shown in FIG. 12 or by obtaining a threshold value on the basis of line height. If there are no clearly visible valleys in the horizontal histogram as shown in FIG. 13 or if an optimum threshold value cannot be determined from the line height as shown in FIGS. 14A–14C, however, it is actually a very difficult problem to correctly recognize characters and symbols.

SUMMARY OF THE INVENTION

It is therefore an object of the present invention to provide a character recognition system for an optical alphanumeric character reader for correctly recognizing similarly shaped upper and lower case letters and various other symbols.

The above and other objects of the present invention are achieved by providing an optical character reader with a character recognition system including label setting means and judging means. After characters are initially identified from individual character images extracted from a line, upper and lower labels are assigned to each of the extracted characters in a character array according to their highest and lowest positions relative to that character array but corrections are thereafter made if these assigned labels contradict with the labels preassigned to the identified characters. Next, certain frequently occurring types of errors are checked in terms of these labels such that characters with similarly shaped upper and lower case letters and sets of similarly looking symbols can be correctly identified.

BRIEF DESCRIPTION OF THE DRAWINGS

The accompanying drawings, which are incorporated in and form a part of the specification, illustrate an embodiment of the present invention and, together with the description serve to explain the principles of the invention. In the drawings: FIG. 1 is a flowchart of character recognition according to the present invention, FIG. 2 is a block diagram of an optical character reader incorporating a character recognition system embodying the present invention, FIG. 3 is an example of binary image of a word, FIGS. 4 and 5 show initially assigned label values for the binary image shown in FIG. 3, FIG. 6 shows an example of reassignment of label numbers according to the present invention, FIG. 7 shows an example of correction between upper and lower case letters according to the present invention, FIGS. 8A and 8B show examples of identification of a period and a comma, FIGS. 9A and 9B show examples of identification of an apostrophe, FIGS. 10A and 10B show examples of identification of a comma and an apostrophe, FIG. 11 shows an example of identification of a hyphen, FIG. 12 shows a prior art method of obtaining detection line from a histogram in the horizontal direction, FIG. 13 shows a situation where no clear valley appears in a histogram of a line in the horizontal direction, and FIGS. 14A, 14B and 14C show examples where an optimum threshold value cannot be set from the line height.

DETAILED DESCRIPTION OF THE INVENTION

In what follows, the present invention is explained by way of an example with reference simultaneously to FIG. 1 which is a flowchart of an operation embodying the present invention and to FIG. 2 which is a block diagram of an optical character reader incorporating the present invention. After a document is placed on a glass table, it is read (scanned) by a line sensor of a scanner 1 and the scanned pictorial image of the document is converted into binary data by an analog-to-digital converter. The line sensor is driven in the secondary scanning direction and the entire document is scanned (Step S2). The binary data of the pictorial image scanned by the scanner 1 are temporarily stored in an image buffer 2, from which a line is extracted by a recognition control unit 3 containing a microprocessor and the extracted line is stored in a line buffer 4 (Step S2). Next, the recognition control unit 3 extracts individual characters from the binary patterns stored in the line buffer 4 and stores them in a single character buffer 5. At the same time, the positions and the sizes of these characters are measured (Step S3) and the recognition control unit 3 extracts their characteristics and stores teem in a single character characteristics buffer 6. A recognition unit 7 then identifies the characters by matching these characteristics with pattern stored in a dictionary memory 8 (Step S4). In this process of identifying the character, the recognition control unit 3 serves to identify characters and symbols having similar shapes by using the relative positional relationships and sizes of extracted characters and assigning position labels to each character as will be explained more in detail below.

To start, the recognition control unit 3 assigns an upper label and a lower label respectively in its upper and lower label buffers to each of the characters in an extracted word by considering their relative positional relationships, their sizes and the results of the initial recognition in Step S4 (Step S11). For each extracted word, the highest and the lowest positions of its characters are determined as $U=\{u_1,u_2,\ldots u_n\}$ and $D=\{d_1,d_2,\ldots d_n\}$ where n is the number of characters in the word and the highest position $M_u$ and the lowest position $M_d$ are determined respectively from U and D as illustrated in FIG. 3 for a scanned character array "computer,". Next, a threshold value T is defined, for example, by $(M_d-M_u)/7$ and "2" is set, as shown in FIG. 4, in the upper and lower label buffers corresponding to the character, or characters for which the condition $|u_i-M_u|<T$ or $|d_i-M_d|<T$ are satisfied (where $i=1,2,\ldots n$). Average upper and lower positions $h_u$ and $h_d$ are then calculated from the remaining highest and lowest positions u and d and the same threshold value T as defined above is used to determine the values of $u_i$ and $d_i$ which respectively satisfy the conditions $|u_i-h_u|<T$ or $|d_i-h_d|<T$ where $i=1,2,\ldots n$. Numerals "1" are set, as shown in FIG. 5, in the upper and lower label buffers corresponding to the highest and lowest positions $u_i$ and $d_i$ which satisfy either of the above inequalities. If there is a contradiction between the labels thus assigned and the results of the initial character recognition by the recognition unit 7 from Step S4, labels are reassigned according to the results of recognition (Step S13). FIG. 6 shows an example of this step. In this example, all four characters in the word "talk" is assigned a lower label number of "2" in Step S12 but these four characters as recognized in Step S4 should all be assigned "1" as lower labels. This contradiction is removed by changing all four lower labels from "2" to "1" as shown in FIG. 6.

After the labels are thus assigned, the results of recognition are examined and, if necessary, corrected. Firstly, it is known that upper and lower cases of some letters are similarly shaped such as between "0" and "o" and between "V" and "v". For such letters, the labels for the lower case letter are often (1,1) while those for the upper case letter are often (2,1) (upper label appearing hereinafter first inside parentheses). This relationship is used to make corrections between upper and lower cases (Step S14). An example of this type of correction is illustrated in FIG. 7 wherein an upper case character "0" with labels (1,1) is corrected to its corresponding lower case character "o".

Secondly, it is known that "," and "." are difficult to identify. Of the characters with labels (0,1) or (0,2), those with the highest position below the center line of a character having labels (1,1) such as "e" and "a" are identified as "," or "." as shown in FIGS. 8A and 8B (Step S15).

Thirdly (Step S16), if there is a character with labels (2,0) and having its lowest position above the center line of a character having labels (1,1), it is identified as "'" and if there are two of them next to each other, they are recognized as """. If a character is originally identified as "," but its labels are (2,0), it is corrected to "'" as shown in FIG. 10A. Similarly, if a character is originally identified as "'" but its labels are (0,2), it is corrected to "," as shown in FIG. 10B.

Fourthly (Step S17), in the case of a character with labels (0,0) having the highest and lowest positions as shown in FIG. 11, it is identified as "—" if the ratio of its length to its height is 3 or greater, and as "." if this ratio is less than 3. After corrections and identifications described above are completed, the identified results are converted into the JIS (Japanese Industrial Standard) code (Step S18).

With a character recognition system of the present invention, it becomes possible to correctly identify alphanumeric characters and symbols which have been difficult to identify by prior art methods depending only on matching with dictionary patterns. The examples used above in the description of the present invention are intended to be illustrative and not limitative. Modifications and variations which may be apparent to a person skilled in the art are included within the scope of this invention.

What is claimed is:

1. In a character recognition system for an optical alphanumeric character reader for recognizing characters by reading a pictorial image, extracting therefrom a line image, extracting therefrom character images of individual characters, and matching said character images with dictionary patterns, the improvement wherein said system comprises label setting means for determining relative positions of the highest and lowest positions of individual extracted characters in a character array, assigning an upper label and a lower label to each of said individual extracted characters according to said highest and lowest positions, correspondence between each of alphanumerical characters and symbols and its upper and lower labels being predefined, correcting, if the result of initial character identification of a character in said character array by said optical character reader contradicts with said upper or lower label assigned to said character, said assigned upper or lower label to the labels corresponding to said recognized character, and storing said corrected labels and result of recognition in a memory means, and judging means for checking whether there is a contradiction between said corrected labels stored by said label setting means and the results of initial character identification by said optical character reader regarding a preselected set of characters and symbols, and correcting, if there is such a contradiction, said results of initial character identification according to said upper and lower labels in said contradiction.

2. The character recognition system of claim 1 wherein said preselected set of characters and symbols include alphabetic letters with similarly shaped upper and lower case figures, the period, the comma, the hyphen, the apostrophe and the quotation mark.

* * * * *

UNITED STATES PATENT AND TRADEMARK OFFICE
CERTIFICATE OF CORRECTION

PATENT NO. : 4,860,376
DATED : August 22, 1989
INVENTOR(S) : Tanaka et al

It is certified that error appears in the above—identified patent and that said Letters Patent is hereby corrected as shown below:

On the title page:
Change inventor's name from "Tanka et al" to --Tanaka et al--.

col. 2, ln. 34, "S2" should read --S1--.

col. 2. ln. 45, "teem" should read --them--.

Signed and Sealed this

Fourteenth Day of August, 1990

Attest:

HARRY F. MANBECK, JR.

*Attesting Officer*      *Commissioner of Patents and Trademarks*